United States Patent [19]

Cummins

[11] Patent Number: 4,869,194
[45] Date of Patent: Sep. 26, 1989

[54] AMPHIBIOUS ACCOMMODATION UNITS

[76] Inventor: Ian G. Cummins, P.O. Box 439, Forster, New South Wales, Australia, 2428

[21] Appl. No.: 200,652

[22] Filed: May 31, 1988

[30] Foreign Application Priority Data

| Jun. 4, 1987 | [AU] | Australia | PI2300 |
| Jun. 24, 1987 | [AU] | Australia | PI2673 |
| Jul. 29, 1987 | [AU] | Australia | PI3555 |
| Aug. 5, 1987 | [AU] | Australia | PI4251 |
| Sep. 9, 1987 | [AU] | Australia | PI4545 |
| Jan. 8, 1988 | [AU] | Australia | PI6216 |

[51] Int. Cl.$^4$ ............................................. B63B 7/04
[52] U.S. Cl. .................................. 114/344; 114/270; 114/353
[58] Field of Search .............. 114/77 R, 344, 352, 114/353, 270; 14/2.6, 27

[56] References Cited

U.S. PATENT DOCUMENTS

| 1,462,800 | 7/1923 | Clemmer | 114/353 |
| 2,659,464 | 11/1953 | Sweetman | 114/353 X |
| 3,090,973 | 5/1963 | Levinson | 114/353 X |
| 4,522,143 | 6/1985 | Holzaur | 114/353 X |
| 4,716,850 | 1/1988 | Lachance | 114/270 |

Primary Examiner—Sherman D. Basinger
Attorney, Agent, or Firm—Bauer & Schaffer

[57] ABSTRACT

An amphibious accommodation unit which includes a main enclosed area incorporating a main hull and a second hull pivotally connected to the main area for movement between a first position wherein it comprises an extension of the main hull so that the unit may be used on water and a second position wherein the second hull is either supported in an upright attitude adjacent the main area or folded over the main area to define a second roof for the main area so that the unit may be used in combination with a trailer as a caravan for land use. The unit may also incorporate pivotal hulls at each end of the main area.

27 Claims, 11 Drawing Sheets

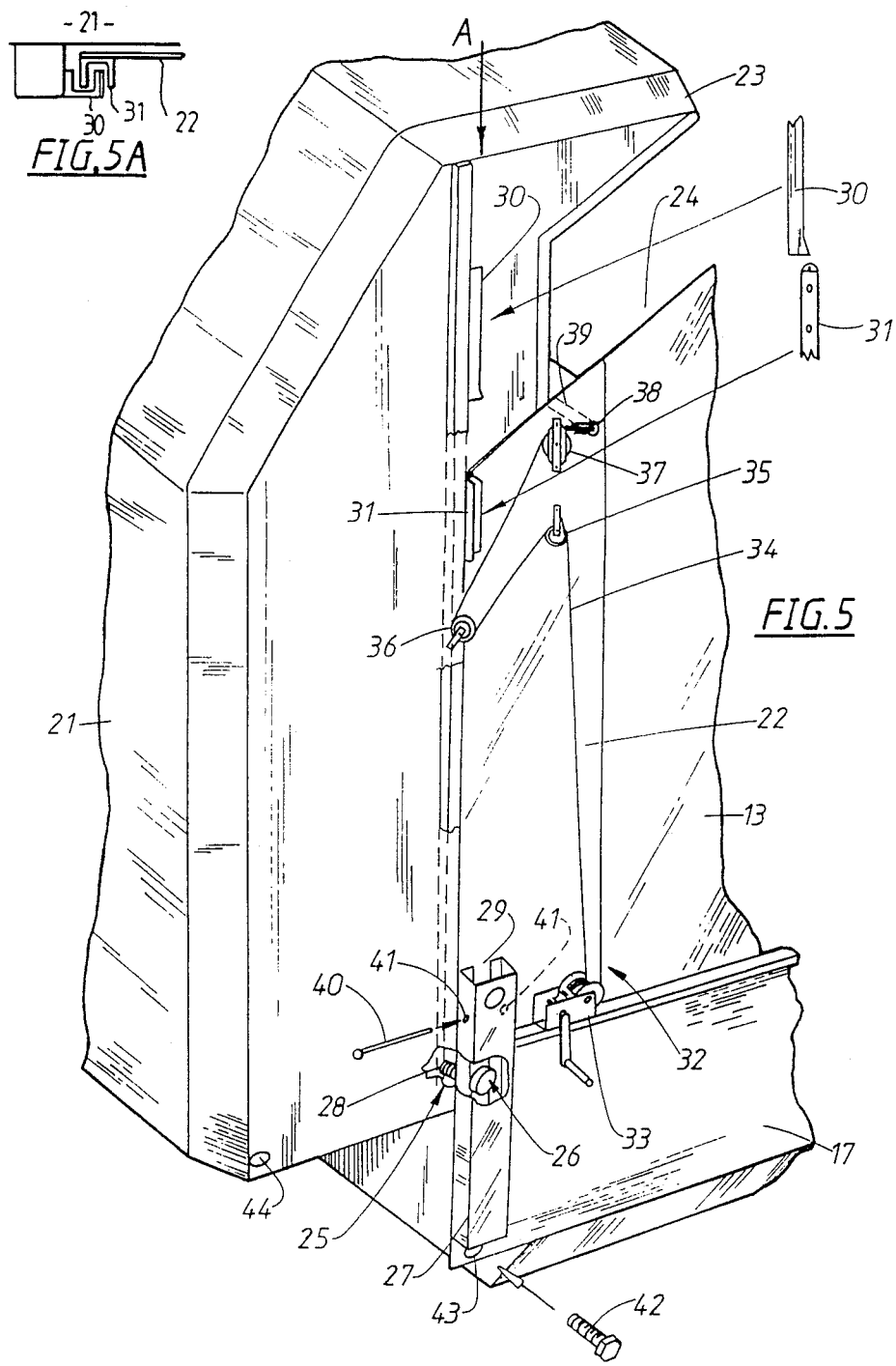

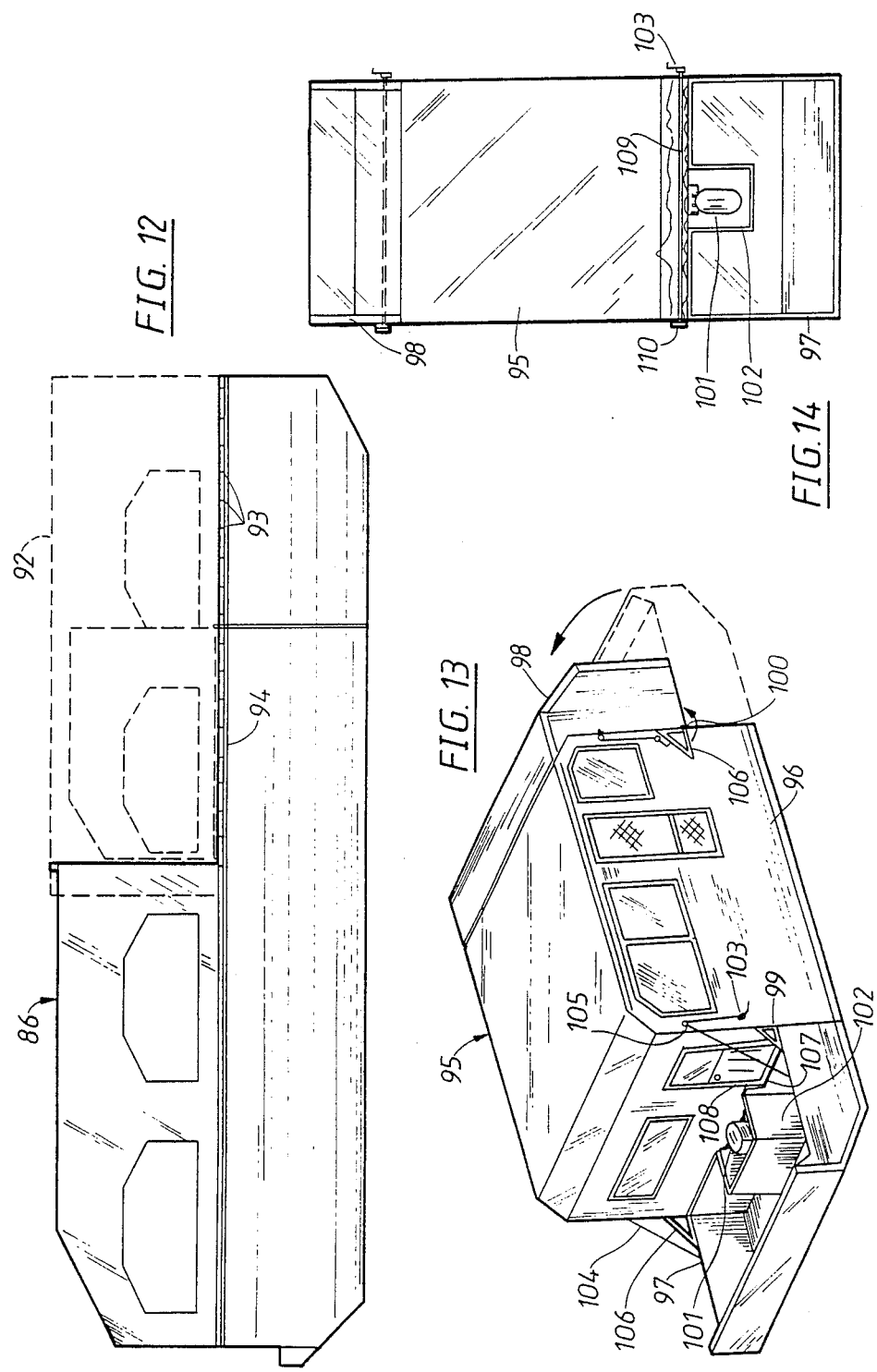

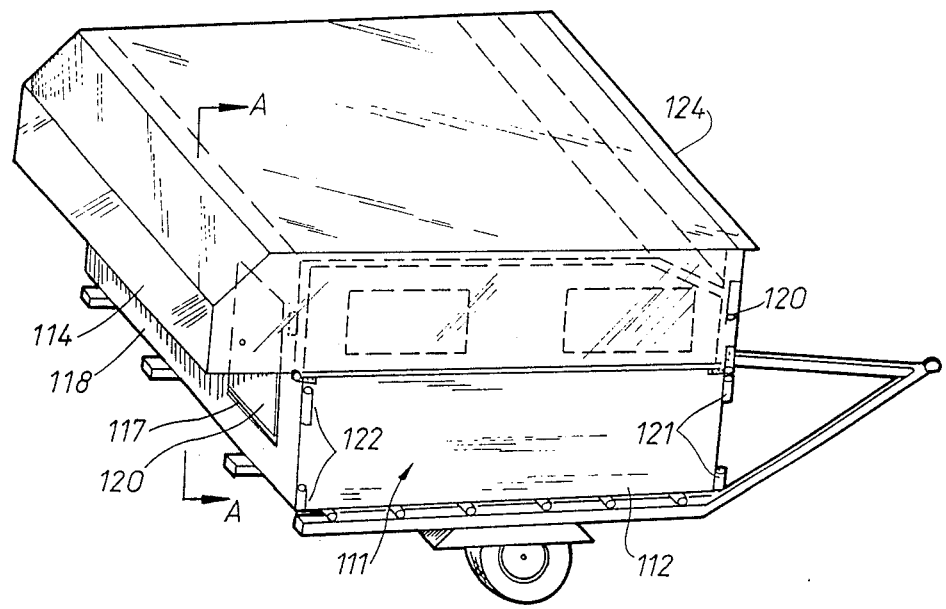
FIG. 15
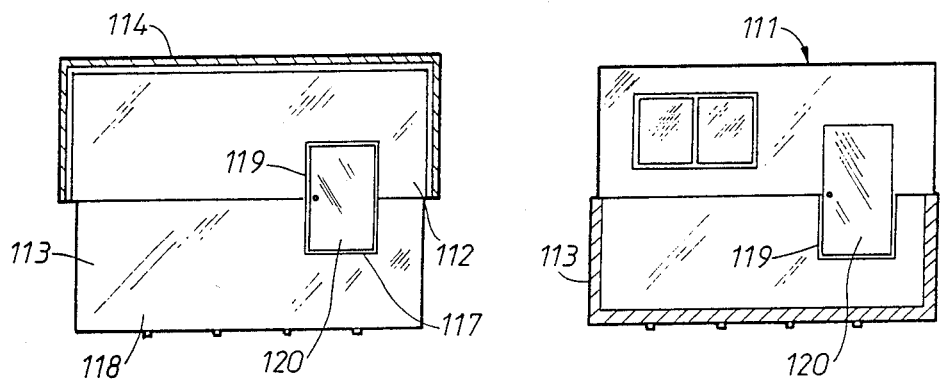
FIG. 17
FIG. 18

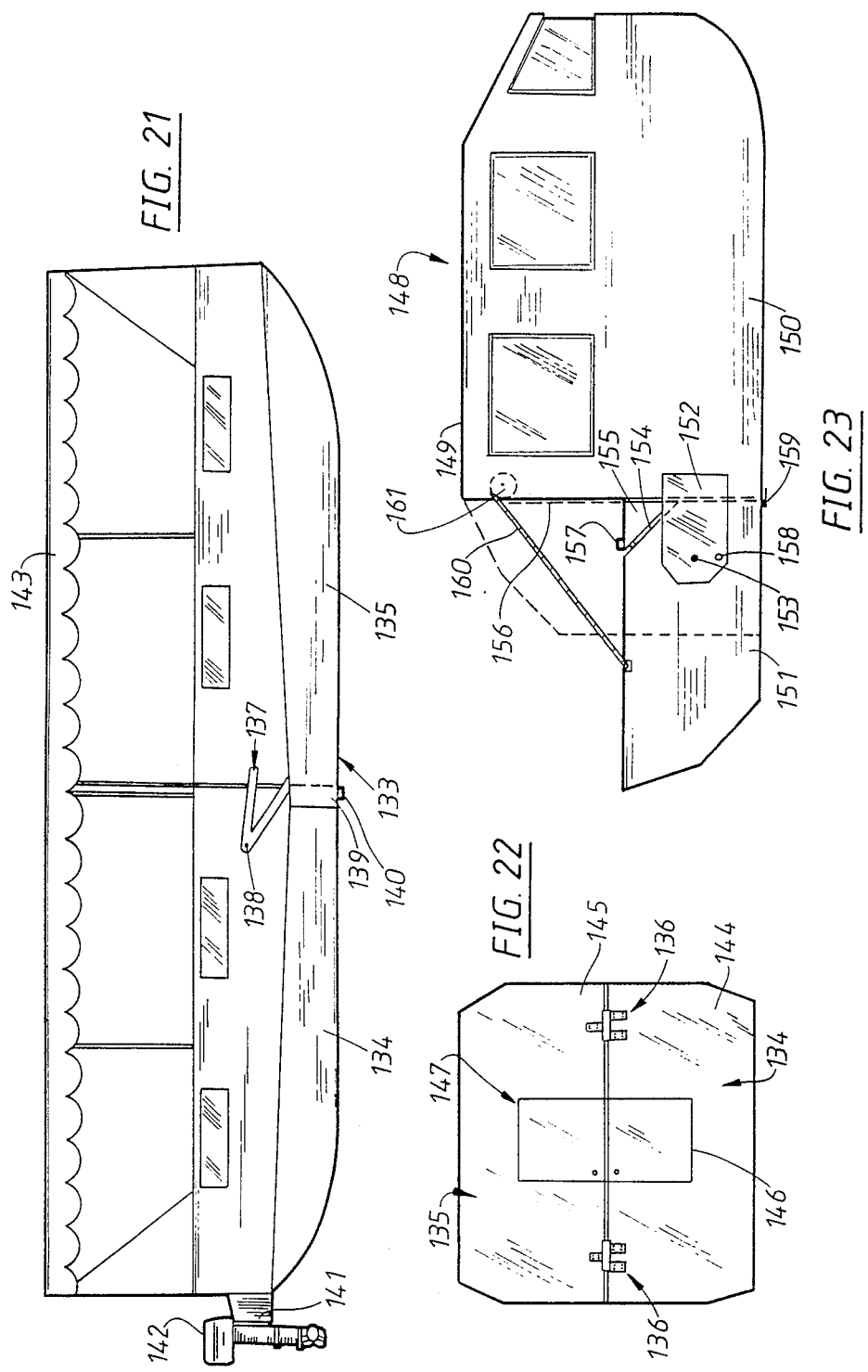

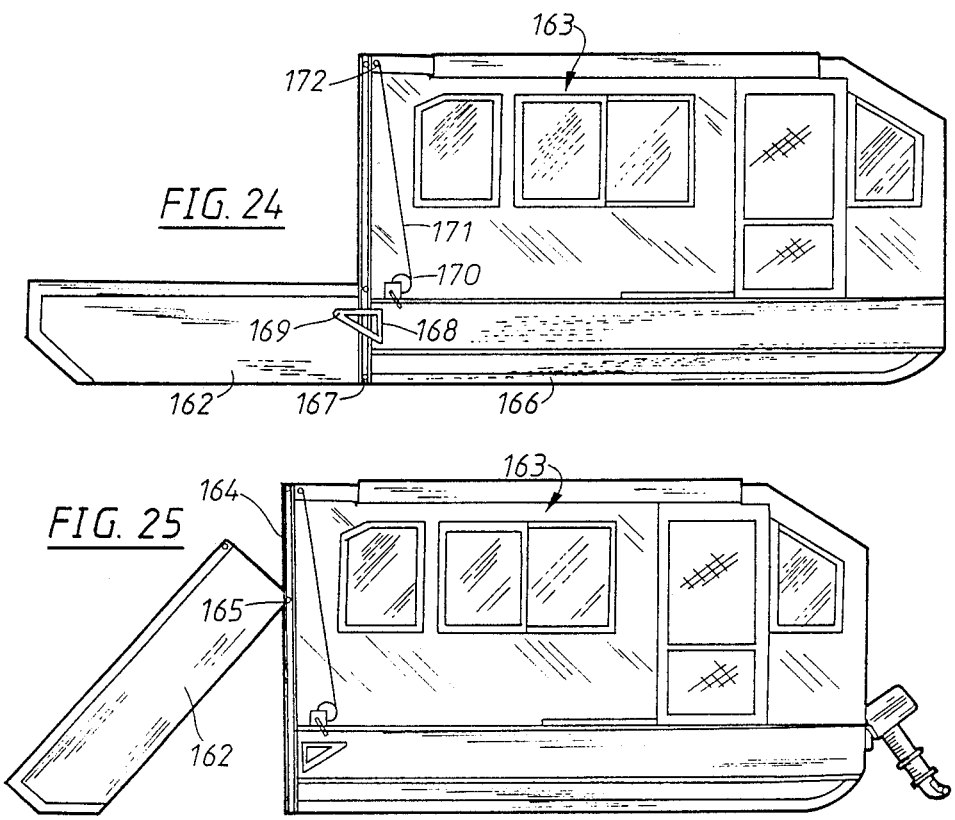
FIG. 24
FIG. 25
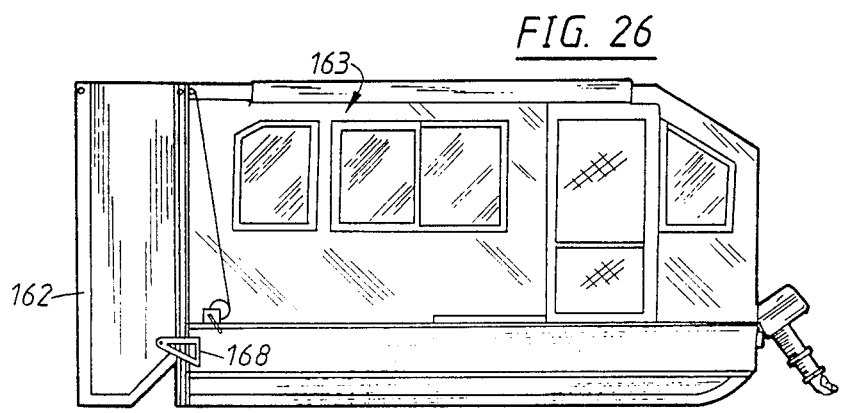
FIG. 26

AMPHIBIOUS ACCOMMODATION UNITS

BACKGROUND OF THE INVENTION

1. Field of the Invention

This invention relates to amphibious units and in particular to units which may be easily converted between a first attitude for use on land and a second attitude for use on water.

2. Description of the Related Art

Caravans have become an increasingly popular vehicle for providing mobile accommodation for persons either for temporary accommodation for example for holiday purposes or the like or for permanent accommodation. Similarly houseboats are popular watercraft which, although usually only suitable for use in confined waterways, provide a considerable area of accommodation for persons again either on a temporary or permanent basis. Normally houseboats are only suited for use on water and caravans are only suited to use on land. Accordingly, if comparable accommodation provided by caravans and houseboats is required both on land and water, a person needs both forms of unit and although this can be achieved by hiring, it generally involves considerable expense.

Proposals have been made in the past to construct a caravan and houseboat in one unit, however, heretofore, such proposals have not proved to be particularly effective either because the unit when used in land situations is of excessive weight and length to enable comfortable towing or because the unit when adapted for water use is not particularly seaworthy.

BRIEF SUMMARY OF THE INVENTION

It is an object of the present invention to provide an accommodation unit which may be used both on land and on water and which is efficient and functional in both modes.

It is a further object of the present invention to provide an accommodation unit which may be simply converted from its land use mode to its water use mode.

It is yet a further object of the present invention to provide an accommodation unit which in its water use mode provides a seaworthy water craft and which is its land use mode provides a comfortable accommodation area. Other objects and advantages of the invention will become apparent from the following description.

With the above and other objects in views, the present invention provides an amphibious accommodation unit comprising a first portion defining an accommodation area within said unit, said first portion including a first hull, a second portion defining a second hull adapted for pivotal engagement with said first portion for pivotal movement about an axis extending transversely of said hulls, said second hull being adapted to be moved between a first position wherein said second hull is longitudinally aligned with, to comprise an extension of said first hull so that said accommodation unit may be used on water and a second position wherein said hull is moved away from alignment with said first hull. Preferably selectively actuable locking means are provided for maintaining said second hull at least in said first position relative to said second hull.

In a first preferred arrangement the first portion hull comprises an open hull fitted with desired accommodation features and the second hull is pivotal over the first hull to overlie the latter in the second position to define a roof over the open hull.

In a second preferred arrangement, the first portion comprises an enclosed area formed on its underside with the first hull and the second hull comprises an open barge-like hull which may in a first embodiment be disposed in a generally vertical attitude when moved to the second position. In a further embodiment the second hull in the second position overlies the first portion.

In one particularly preferred form the second hull after pivotal movement to its generally vertical attitude, is moved vertically downwardly so that its lower edge is substantially aligned with the lower edge or keel line of the first hull.

If desired respective pairs of second hulls may be provided at opposite ends of the first hull to be moved between second positions as described above for use on land to first positions for use in water wherein the second hulls comprise opposite extensions of the first hull. In one preferred arrangement the respective hulls when moved to second positions where they overlie the first portion, locate one within the other.

In a further embodiment, the first portion hull is extended beyond the accommodation area and the second hull is a smaller hull pivoted to the first hull for movement between a position where it overlies the extension of the first hull and a position where it comprises a longitudinal extension of the first hull.

The hulls may have any configuration desired such as mono-hull, catamaran, V-shape, trimaran, pontoon style or punt style.

Furthermore the unit may also include an awning slidably or otherwise mounted to the first portion and extendible therefrom over the second hull to form a rain or sun cover.

BRIEF DESCRIPTION OF DRAWINGS

In order that the invention may be more readily understood and put into practical effect, reference will now be made to the accompanying drawings which illustrate a preferred embodiment of the invention and wherein:

FIG. 5 illustrates details of the connection between the components of the unit;

FIG. 5A is an enlarged top view in the direction A of FIG. 5 showing the relationship between the cooperative restraining members of the unit;

FIG. 12 illustrates the embodiment of FIG. 11 with a sliding top section;

FIG. 13 illustrates a further embodiment of the invention provided with a pair of extendible hulls;

FIG. 14 is a part sectional plan view of the unit of FIG. 13;

FIG. 15 is a perspective view of a further accommodation unit according to the invention mounted on a trailer;

FIGS. 17 and 18 are sectional views along lines A—A and B—B of FIG. 15 and 16 respectively.

FIGS. 21 is a side view of a further amphibious unit according to the invention;

FIGS. 22 is an end view of the unit of FIG. 21 in a folded attitude;

FIG. 23 is a side elevational view of a further form of the invention; and

FIGS. 24 to 26 illustrate an alternative embodiment in various modes.

DETAILED DESCRIPTION OF THE INVENTION

Figure 1:
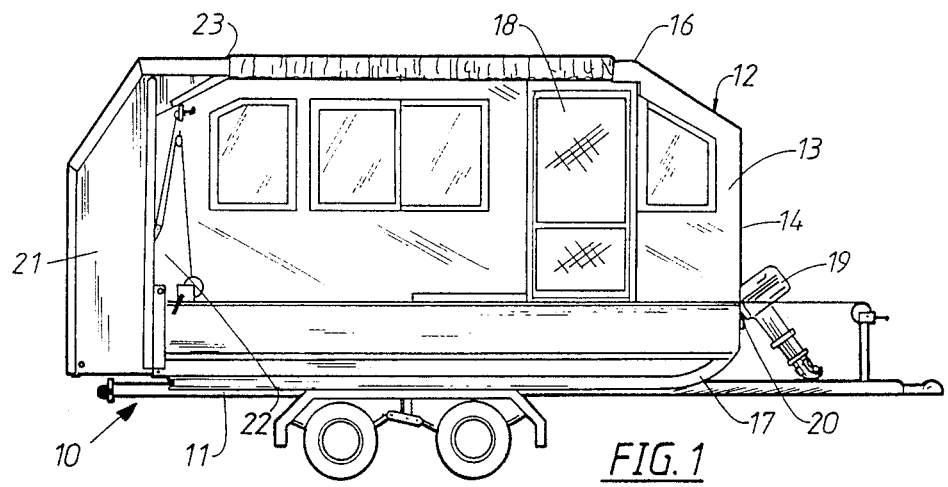
FIG. 1 illustrates in side elevational view a first form of accommodation unit according to the present invention on a trailer adapted for use on land.

Referring to the drawings and firstly to FIG. 1, there is illustrated an amphibious accommodation unit 10 according to the present invention mounted on a trailer 11 to enable towing by a vehicle. The unit 10 includes a first accommodation part 12 which is in the general form of a caravan type body having side walls 13, opposite end walls 14 and 15 and a top-wall 16 and including a floatable hull 17 which in this embodiment is in the form of a catamaran type hull. The part 12 houses all the conventional appliances and furniture of a normal caravan such as bunks, stoves, fridges, tables or dinettes as well as W.C. and shower and as shown the side walls 11 and end wall 15 are fitted with windows and an external access door 18 is provided to enable access into the interior of part 11.

A motor such as an outboard motor 19 is also fitted to the hull 17 via a conventional bracket 20 and controls for the motor such as a steering wheel, throttle etc. are located with the part 12 to enable the engine to be steered and controlled.

Mounted to the end of the first part 12 at the opposite end to the motor 19 is a further hull 21 of open barge-like form which in the land use attitude shown in FIG. 1 is located in a substantially vertical attitude and nested neatly into the first part 12. For this purpose, the opposite side walls 13 of the first part are provided with extended flange portions 22 which are located on opposite sides of the hull 21 in the FIG. 1 attitude to prevent lateral movement thereof during road transportation.

The bow of the hull 21 is raised at 23 to increase the seaworthyness of the unit 10 and the wall 15 of the part 12 is bevelled at 24 so that the hull 21 can neatly be engaged therewith.

The hull 21 as more clearly shown in FIG. 5 is provided on opposite sides adjacent the gunwales with respective headed pivot pins 25, the heads 26 of which are located in and captive in vertical channel sectioned tracks 27 secured to the flange extensions 22 of the side walls 13 and the shanks 18 of the pins 25 project through elongated slots 29 in the tracks 27 into the hull 21 to define a pivot support therefor.

The hull 21 and flanges 22 are also provided with co-operable restraining members 30 and 31 which are suitably in the form of opposite channel members which locate within each other when the hull 21 is in the FIG. 1 attitude to assist in maintaining the hull 21 in that attitude.

The hull 21 is adapted to be moved from its position shown in FIG. 1 for land use to the position shown in FIG. 5 for water use by means of the winch and cable arrangement 32. This arrangement includes a hand operated winch 33 mounted to the side wall 13 and a winch cable 34 which extends from the winch 33 about a block 35 secured to the side wall flange 22, about a further block 36 secured to the hull 21 at intermediate position therealong and thence about a further block 37 supported on the flange 21 and about an adjacent fixed block 38 for passage preferably through a tube 39 to the opposite side of the first part 11 where the cable 34 passes about similar blocks 38', 37' and 36' to be tied off by a shackle to a point on the wall flange 22 adjacent the block 37'.

Figure 3:
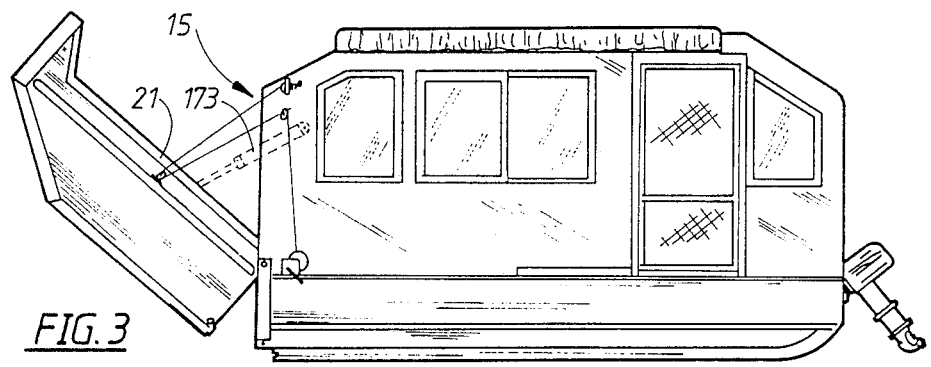

When it is desired to move the hull 21 to its operative position for use on water, the winch 33 is operated which will elevate the hull 21 from the position shown in FIG. 1 to that shown in FIG. 3 with the heads 26 of the respective pivot pins 25 during this movement moving along and within the tracks 27. Furthermore the co-operating channels 30 and 31 move during this time to a position wherein they are out of register with each other. When the pivot pins 25 reach the upper ends of the tracks 27, lock pins 40 are inserted into respective aligned apertures 41 in opposite walls of the tracks 27 to prevent downward movement of the pivot pins 25. The winch 33 may then be reversed to slowly release the cable 34 so that the hull 21 will pivot away from the part 11 moving through the position shown in FIG. 3 to the position shown in FIG. 4 wherein the hull 21 is substantially aligned with the hull 17 and constitutes an extension thereof. To maintain the hull 17 locked in this attitude, a pair of threaded locking bolts 42 are provided for passage through respective apertures 43 in the flanges 22 into threaded bores 44 in the hull 20 (see FIG. 5).

Figure 4:
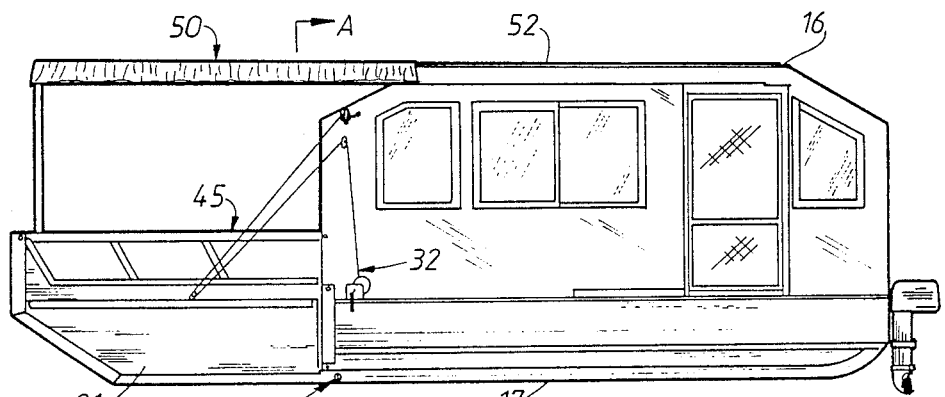
Figure 6:
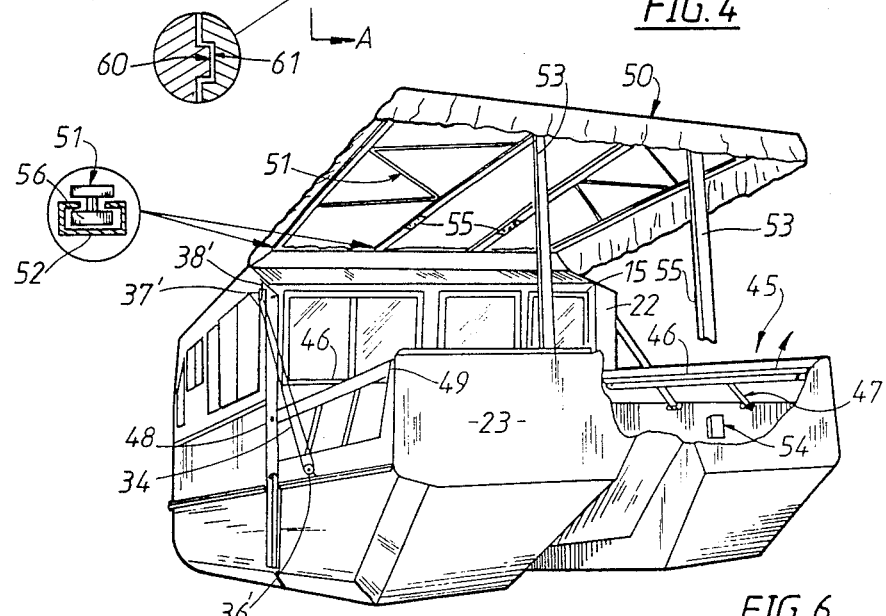
FIG. 6 is a front perspective view of the unit shown in FIG. 4.

The hull 21 is further supported in its operative attitude by respective pairs of railings 45 as more clearly shown in FIGS. 4 and 6, The railings 45 comprise elongated rail members 46 which are connected to struts 47 pivotally connected at their lower ends to the hull 21 and pivotal from a folded attitude to an erected attitude wherein opposite ends of the rail members 46 are connected by bolting at 48 and 49 to the flanges 22 and raised hull portion 23.

The part 11 also include an awning assembly 50 which includes a covered frame 51 slidably mounted in tracks 52 which extend along the top wall 16 (see FIG. 4). The awning assembly 50 may be extended out to the position shown in FIGS. 4 and 6 and to support the free end of the assembly 50, a pair of support members 53 are provided, these members 53 being pivotally moveable from a inoperative position wherein they are held adjacent the frame 51 to the erected position of FIGS. 4 and 6 wherein the lower ends of the members 53 are supported in sockets 54 on the hull 21. Preferably the members 53 are retained in position in their inoperative attitude by means of VELCRO type hook and loop material 55. Preferably also the tracks 52 are of channel section form to slidably receive elongated members 56 of the frame 51.

Figure 7:
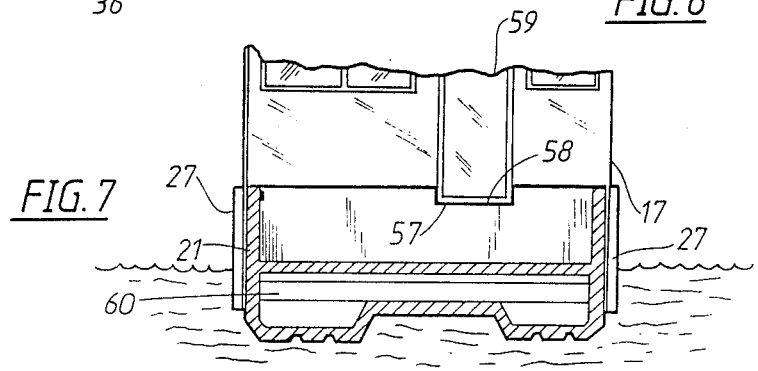
FIG. 7 is a sectional view along line A—A of FIG. 4 showing details of the mating bulkheads of the respective hulls.

As shown in FIG. 7, the respective mating hulls 21 and 17 are provided with cut-out portions 57 and 58 in their end bulkheads, the cut-out portions being disposed above the water level and defining a through passage between the hulls 17 and 21. The main part 12 is provided with a door 59 aligned with the respective cut-out portions as illustrated.

Figure 2:
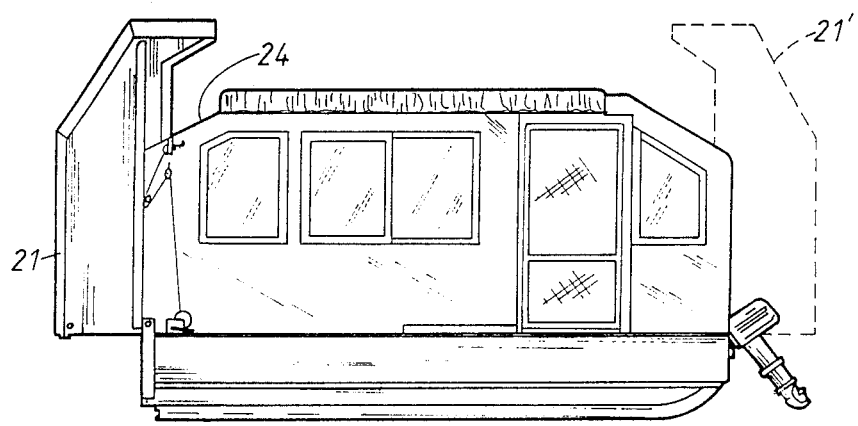
FIGS. 2 to 4 illustrate the manner of conversion of the unit of FIG. 1 to a unit suitable for use on water.

A further hull 21' as shown in dotted outline in FIG. 2 may also be provided at the end of the main part 12 opposite the hull 21 to be raised and lowered in a similar manner to that described above so that extended living space on water is provided for the unit 10.

To reduce the passage of water between adjacent bulkheads of the hulls 21 and 17, the hull 21 is provided with a transversely extending rib or moulding 60 and the hull 17 provided with a complimentary recess 61. It will be apparent that when the hull 21 is moved to the FIG. 4 and 6 position the rib 60 will rest within the recess 61 so as to substantially prevent water passing into the area between the mating bulkheads. In an alternative arrangement, the hull 21 may be provided with the recess 61 and the hull 17 with the complimentary rib 60.

Figure 8:
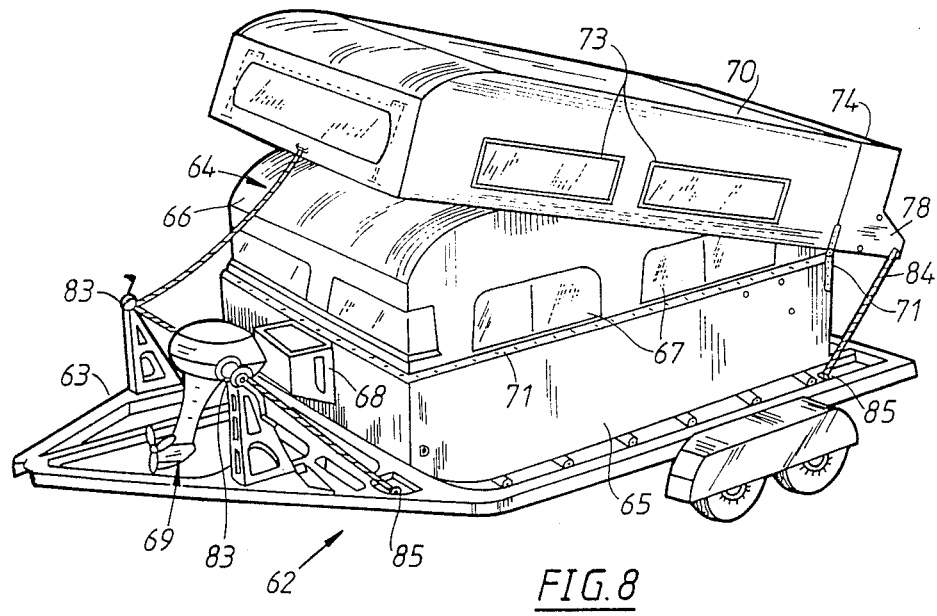
FIG. 8 illustrates a further embodiment of the invention mounted on a trailer.
Figure 9:
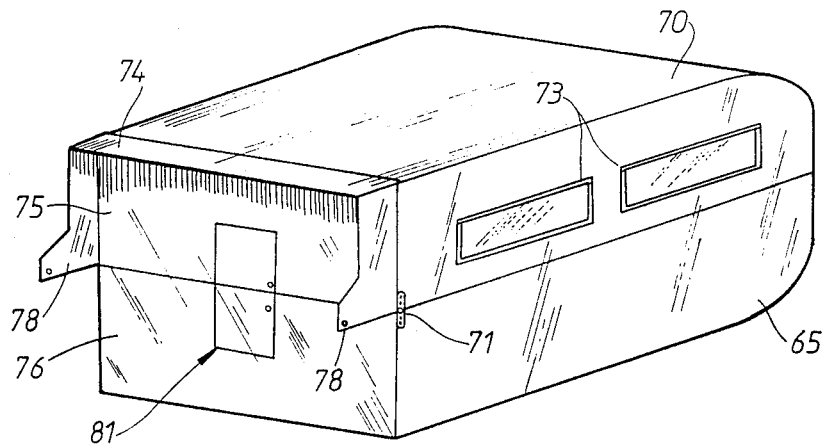
FIGS. 9 and 10 illustrate the unit of FIG. 8 in a land use and water use mode respectively.
Figure 10:
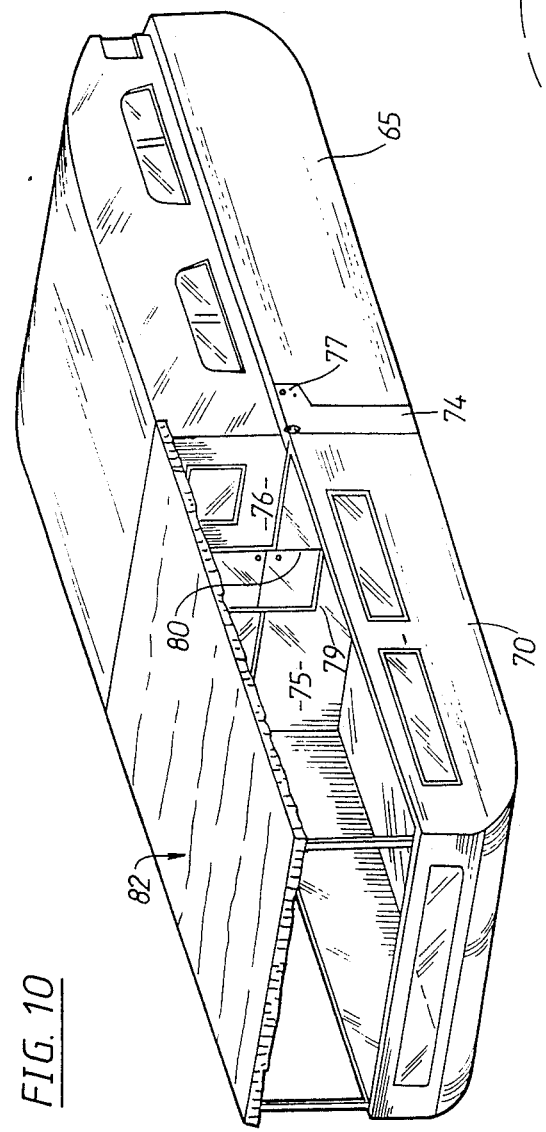

Referring now to FIG. 8, there is illustrated an alternative form of amphibious accommodation unit 62 according to the present invention mounted on a trailer 63 and shown in transition between its "land use" mode (shown in FIG. 9) and its "water use" mode (shown in FIG. 10). The unit 62 includes a main accommodation part 64 including a hull portion 65 and a top section 66 which defines with the hull portion 65, an enclosed area in which may be located bunks, a stove or any other item. The top section 66 is also suitable provided on its side walls with sliding windows 67 and a bracket 68 supporting an outboard motor 69 is provided at the rear of the hull portion 65 to provide motive power for the unit when on the water.

The unit 62 also includes a further hull portion 70 which may be moved between the position shown in FIG. 10 for use on water to the position shown in FIG. 9 overlying the top section 66 of the part 64 for use on land.

The hull portion 70 is of open barge-like form and is complimentary to the top section 66 to define in the FIG. 8 attitude a false top over the top section 66 so as to provide improved insulation against heat and cold to the accommodation part 64. The hull portion 70 is hinged at opposite sides to the hull portion 65 by means of a pair of hinges 71 for pivotal movement about a transverse horizontal axis and the top section 66 and hull portion 65 define at their point of transition a ledge 72 upon which the gunwales of the hull portion 70 may rest in the FIG. 9 attitude.

The hull 70 is preferably provided with windows 73 which are hopper style outwardly opening windows which in the closed position are sealed to the hull 70 but which are aligned with the sliding windows 67 when the hull 70 is pivoted to overlie the top section 66. Each window 73 thus may be opened by firstly opening the adjacent sliding window 66 which will give access to the latching mechanism of the window 73.

The hull 70 also includes a rearwardly extending peripheral skirt 74 which in the FIG. 10 attitude overlies the join between the respective hulls 65 and 70 to prevent the passage of water between the respective mating bulkheads 75 and 76 of the hulls. Locking pins 77 are also provided to pass through the skirt 74 and into sealed apertures in the hull 65 to lock the hull 70 in the extended position as shown. Preferably and as shown the skirt 74 includes on opposite sides a pair of rearwardly extending arm portions 78 which define lever arms to assist in moving the hull 70 to its extended position in the manner shown in FIG. 8.

The mating bulkheads 75 and 76 of the respective hulls 70 and 65 are provided with corresponding openings or cut-out portions 79 and 80 which define through passages between the respective hulls in the FIG. 10 attitude and also cooperate in the FIG. 9 position to define a door opening 81 into the unit 62 so that the unit may be used as a caravan. The openings 79 and 80 are also raised substantially above the water level of the floating unit so that water will not enter into either hull therethrough. As shown in FIG. 10, an erectable awning 82 may be provided over the hull 70 to define a sun or weather shade. If desired the awning 82 may be of the type shown in FIGS. 4 and 6. Furthermore, the skirt 74 may be replaced by a cooperative rib/recess arrangement similar to that shown at 60 and 61 of FIG. 4.

Preferably the trailer 63 for carrying the unit 62 is provided with a pair of winches 83 at its forward end and on opposite sides thereof and cables or lines 84 pass from the winches 83 about respective guide rollers 85 to the lever arms 78. The winches 83 when operated will thus move the hull 70 from its folded attitude of FIG. 9 to its extended attitude of FIG. 10.

Figure 11:
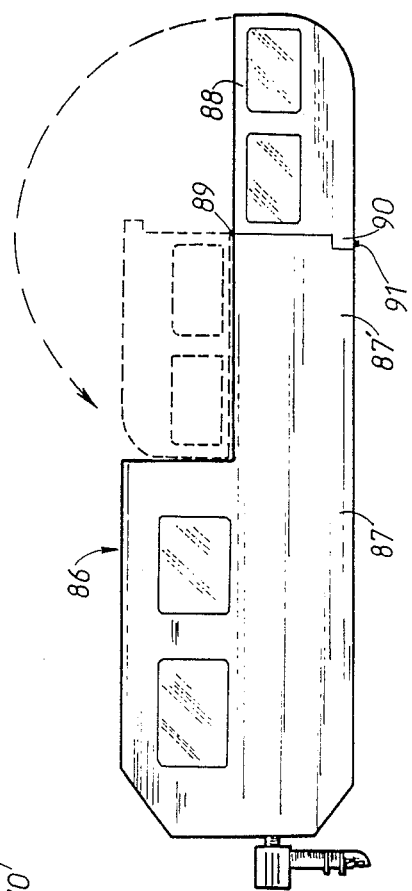
FIG. 11 illustrates yet a further embodiment of the invention.

FIG. 11 illustrates an alternative embodiment of the invention which in this case includes an enclosed accommodation area 86 having a hull portion 87 which extends at 87' beyond the area 86. A further hull 88 of similar length to the length of the hull portion extension 87' is pivotally connected at 89 to the hull portion 87' and may be moved between the extended position shown to a folded position shown in dotted outline where it overlies the extension 87' of the hull portion 87. The hull 88, as in the FIGS. 8 to 10 embodiment, preferably includes a rearwardly extending skirt 90 which shields the join between the respective hulls 88 and 87 in the extended attitude in a similar manner to that described above. Locking pins 91 similar to that shown and described in FIG. 10 may be used to lock the hull 88 in its extended position. An erectable awning or shade may be provided to shade the hulls 87 and 88 when the latter is in its extended position.

Alternatively and as shown in FIG. 12, the main area 86 may be provided with a slidable top 92 having rollers 93 on its lower edge which engage a track 94 on the main area 86. The top 92 may be slid from a position over the area 86 to a position shown in dotted outline wherein the top 92 is located over the hulls 87 and 88 to provide improved weather proofing to the open hulls. As with the other embodiments described above, the respective hulls 87 and 88 have mating bulkheads provided with corresponding cut out portions defining through access openings between the hulls located above the normal floating water level of the unit. Further the hull 88 when folded defines with the hull 87 an access opening which may be closed by a door similar to that shown in FIG. 9 for land use.

FIGS. 13 and 14 illustrate yet a further alternative embodiment of the invention comprising a main enclosed accommodation part 95 including a hull 96 and pair of open hull sections 97 and 98 pivotally connected at 99 and 100 to the part 95, for movement between the extended position (shown at the left hand end of the part 95) and a folded position (shown at the right hand end of the part 95). An outboard motor 101 is supported on the main hull 96 and the hull section 97 includes a recessed bulkhead 102 which is disposed about the motor 101 when the hull 97 is in its extended position. Preferably the hulls 97 and 98 are moveable between their extended and folded positioned by means of winches 103 on the main unit and cables 104 which pass about pulleys 105 to be connected to the hulls 97 and 98 and it will be apparent that winding up of the winches 103 will move the hulls 97 and 98 to the upright folded position.

To maintain the hulls 97 and 99 in their operative attitude for use on water, respective triangular braces 106 are pivotally connected to the main accommodation part 95 on opposite sides and at opposite ends thereof, the braces 106 when pivoted into alignment with the hulls 97 and 98 as shown at the left hand end of FIG. 13 assisting in maintaining the hulls 97 and 98 in the extended positions shown and resisting upward forces.

As with the previous embodiments, the hulls of the main part 95 and extensions 97 and 98 are provided with mating cut-out portions 107 and 108 which are considerably higher than the normal floating water level so that water will not enter the hulls. It will be apparent that the cutouts or openings 107 and 108 mate to define passageways between the hulls when the hulls 97 and 98 are extended.

So that winches 108 are not required on either side of the main unit 95, the winches 103 on one side may be provided with an extended shaft 109 which extends through to the opposite side of the unit to have mounted thereon a pulley 110 around which the cable 104 on that side is wound (see FIG. 14). Thus operation of the winches 103 on one side will cause winding up of the cables 104 on both sides and thus upward pivotal movement of the hulls 97 and 98.

Figure 16:
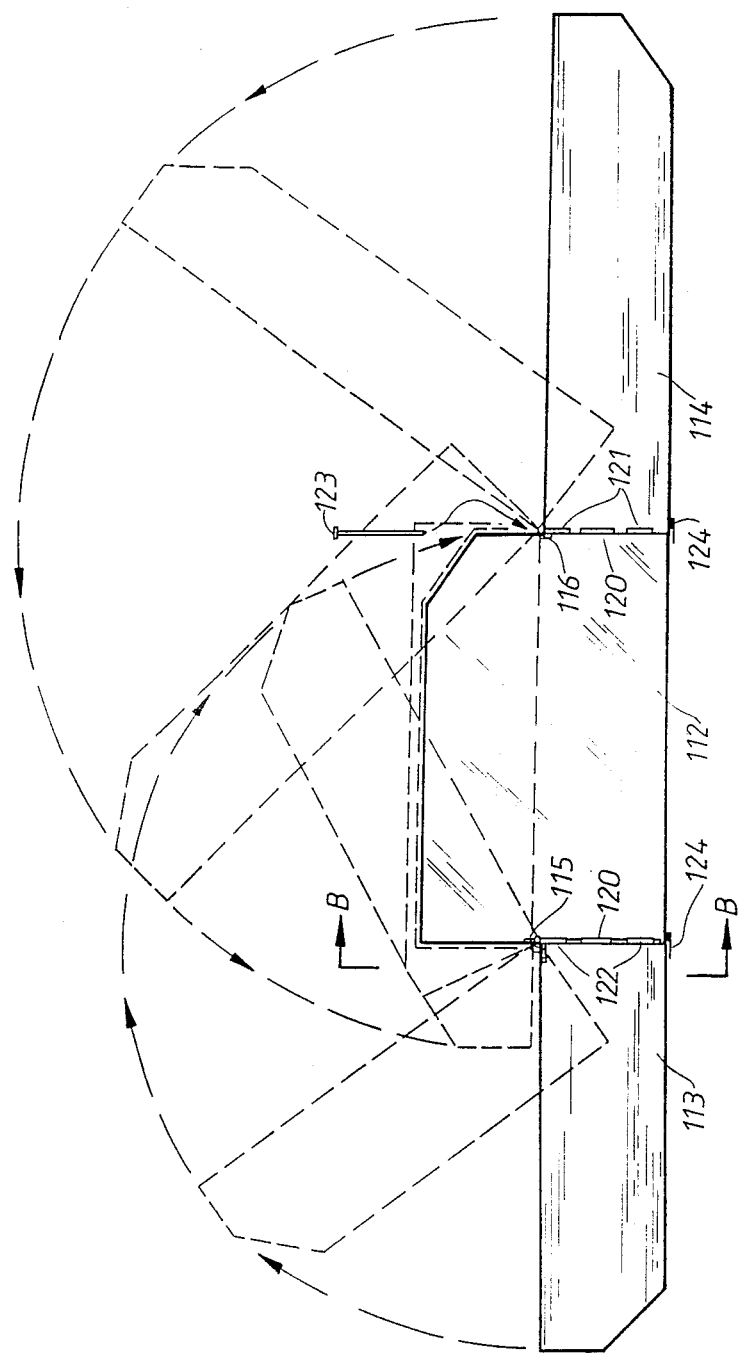
FIG. 16 is a side elevational view of the unit of FIG. 15 in water use mode.

Referring now to FIGS. 15 to 18, there is illustrated a further embodiment of the invention including a main central enclosed accommodation part 111 having a hull portion 112 and a pair of open hulls 113 and 114 pivotally connected via hinges at 115 and 116 to opposite ends so as to be movable between the extended position shown in FIG. 16 wherein the hulls 113 and 114 comprise extensions of the hull portion 112 at opposite ends thereof to the position shown in FIG. 15 wherein the hulls 113 and 114 are folded over the main part 111 and so that the hull 113 is nested within the hull 114. It will be apparent in this embodiment that when it is desired to move the assembly to a folded attitude the hull 113 must first be pivoted to a position over the main part 111 after which the hull 114 may be pivoted to its folded position over the hull 113. Preferably the main part 110 has a door cut-out 117 in its end bulkhead 118 located at a position above the floating water level of the craft and the hull 113 is provided with a cut-out opening 119 which is aligned with the lower part of the door cut-out 118 when in the extended position and the top part of the door cut-out 118 when in the closed position as shown in FIGS. 18 and 17.

Access may be thus gained through the door 120 into the main part 111 in both attitudes and it will be apparent in FIG. 15, that although the door 120 is located underneath the folded hull 112, entry is still possible through the door 120 into the interior of the part 111 so that the unit can be used on land as a caravan (as shown in FIG. 15 mounted on a trailer).

In this vessel an outboard motor may be arranged in a well in the part 114 or alternatively in an arrangement similar to that shown in FIG. 12. Window assemblies similar to that described in FIGS. 7 to 10 may also be provided in the respective parts as shown in dotted outline in FIG. 15.

To lock the hulls 113 and 115 in an extended position each hull may include respective apertured lugs 120, 121 and 122 which are aligned in FIG. 16 attitude to receive locking pin 123 therethrough, these pins 123 preventing pivotal movement of the hulls 113 and 115 away from their FIG. 16 position.

Preferably the hulls 113 and 115 are provided with skirt portions 124 which in the extended position of the hulls overlap the join between the respective hulls to prevent or reduce water entering between the hulls.

Figure 19:
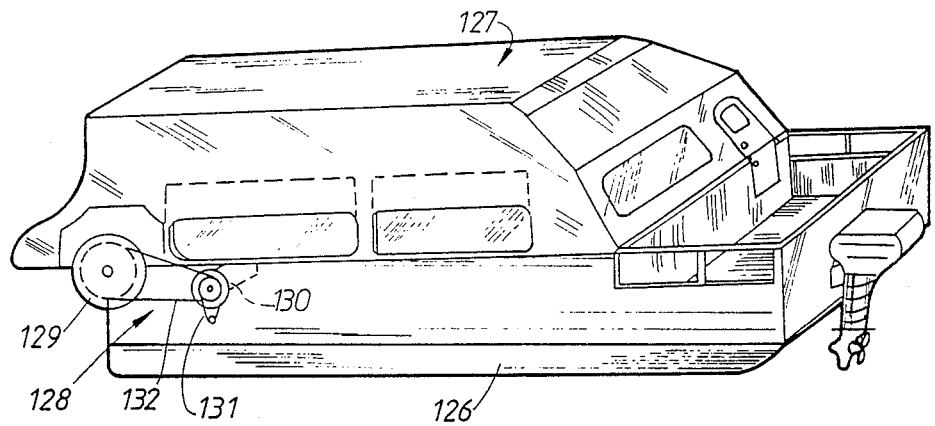
FIGS. 19 and 20 illustrate a further embodiment of the invention.
Figure 20:
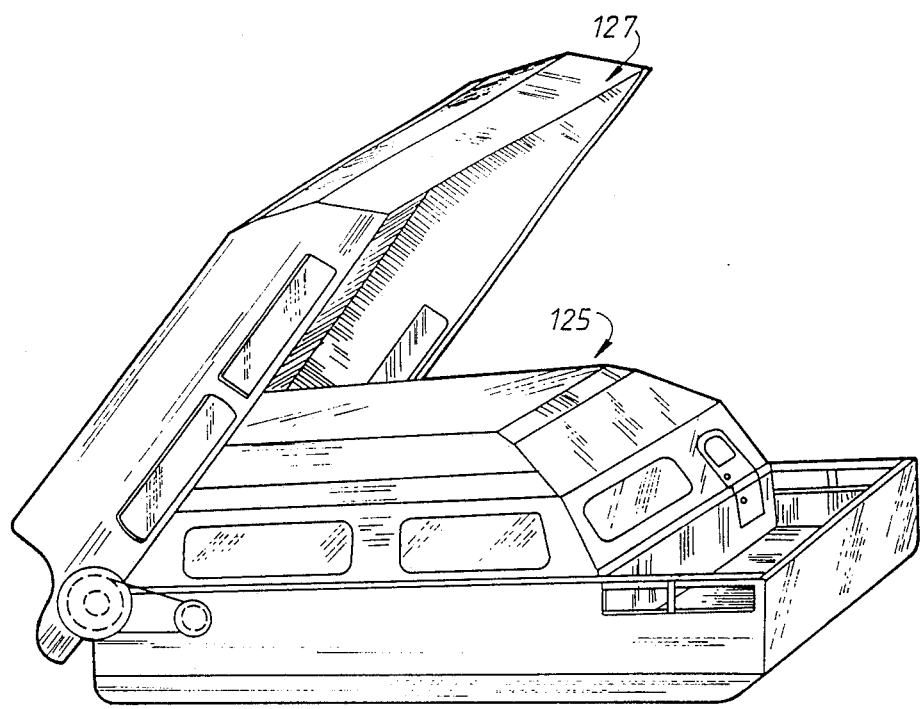

FIGS. 19 and 20 illustrate yet a further embodiment of the invention similar in concept to the embodiment of FIG. 8 but including in this instance a main part 125 having a hull portion 126 which extends rearwardly of the enclosed accommodation part 125 and which carries an outboard motor. A further open hull portion 127 as illustrated is pivotally connected to the main hull portion 126 to be movable between a position where it overlies the part 125 as shown in FIG. 19 to a position where it comprises an extension of the hull portion 126 (shown partway moving towards its extended position in FIG. 20). In this embodiment, movement of the hull portion 127 between its respective positions is achieved by means of a belt and pulley transmission 128 including a main pulley 129 coupled to, for movement with the hull portion 127, an electric motor 130 supported within the main part 125 and having a smaller pulley 131 connected thereto and a belt 132 which passes about the respective pulleys 129 and 131.

It will be apparent that operation of the motor 130 (and thus pulley 131) in opposite directions will cause through the belt 132 and pulley 129, pivotal movement of the hull portion 127 in opposite directions. The pulleys 129 and 131 and belt 132 could of course be substituted by a pair of sprocket wheels and chain.

FIGS. 21 and 22 illustrates a simplified version of amphibious unit 133 according to the present invention. In this embodiment, the unit 133 comprises a pair of substantially identical hulls 134 and 135 which are hinged together by means of a pair of hinges 136 for movement about a transverse axis. The hulls 134 and 135 may be moved between the extended position shown in FIG. 21 for use on water and the folded position shown in FIG. 22 for use on land. In the former attitude, the hulls 134 and 135 are suitably locked together by means of a triangular bracing 137 pivotally connected to one hull 135 and adapted to be engaged with the other hull 134 by means of a locking pin 138 which passes through the bracing 137 into the hull 134. One hull 135 is also provided with a rearwardly extending skirt 139 which overlies the join between the respective hulls when they are in an extended position. Locking of the hulls 134 and 135 in their extended position is also further facilitated by means of a locking pin or pins 140 inserted through the skirt 139 into the hull 134. One hull 134 also carries a bracket 141 for supporting an outboard motor 142. An awning 143 may be erected over the extended hulls to provide a rain and/or sun shade if desired.

When moved to a land use mode as shown in FIG. 22, the awning 143 is removed and one hull 135 pivoted to overlie and mate with the other hull 134. As shown, the end bulkheads 144 and 145 of the respective hulls are provided with cut-out portions 146 and 147 which in the extended position of the hulls are disposed above the floating water level and which cooperate to define a passage between respective hulls. In the FIG. 22 folded position of the hulls, the cut-out portions 146 and 147 cooperate to define an access opening into the interior of the folded hulls so that the unit may be used as a caravan. The cut-out portions 146 and 147 may be provided with doors as shown.

Referring now to FIG. 23, there is illustrated a further embodiment of an amphibious accommodation unit 148 according to the present invention including a main enclosed area 149 which incorporates a hull 150 and a further hull 151 which may be pivoted from the extended position shown to the upright position shown in dotted outline.

For this purpose the main area 149 is provided on opposite sides with a pair of forwardly extending pivot supports 152 to which the hull 151 is pivotally connected by respective pivot pins or bolts 153. The gunwales of the hull are cut-away at 154 adjacent the main hull 150 so that during pivoting the hull 151 will not foul against the hull 150.

To maintain the hull 151 in its extended position as shown, respective triangular braces 155 are pivotally connected to the main area 149 for movement between an inoperative position where there are located either against the forward wall or bulkhead 156 of the area 149, to an operative position wherein the braces 155 are located in the similarly shaped cut-out portion 154 of the hull 151 to prevent pivotal movement thereof away from the extended position. Preferably, the braces 155 are locked in their operative position by means of pins 157 passed therethrough into the hull 151. Further locking pins 158 may be inserted into apertures in the supports 152 into the hull 151 to prevent pivotal movement thereof in the extended position.

The hull 151 is also suitably provided with a skirt 159 which in the extended position of the hull 151 overlies the join between the hulls 150 and 151 to reduce the passage of water therebetween.

To assist in moving the hull 151 to its raised position, respective cables or ropes 160 may be connected to each side to pass about spring loaded rollers 161 supported in the main area 149. The rollers 161 will thus tend to roll up the cables 160 when the locking pins 157 and 158 are released and when the braces 155 are moved to their inoperative attitude so as to assist in raising the forward hull 151. Alternatively or additionally the rollers 161 may be provided with a handle so that a manually operable force may be applied to rotate the rollers 161.

The respective hulls 150 and 151 preferably have mating cut-out portions similar to the preceding embodiments to faciliaate passage between the hulls 150 and 151.

FIGS. 24 to 26 illustrate a further embodiment of the invention similar to that shown in FIGS. 1 to 7 but arranged in this instance so that the hull 162 folds in an opposite direction against the main accommodation area 163 For this purpose the main area 163 is provided on opposite sides with full length guides or tracks 164 and the hull 162 is provided with opposite guide pins 165 which locate in the guides 164. In the extended position shown in FIG. 24, the hull 162 constitutes an extension of the hull 166 of the main area 163 and is maintained in that attitude by further pins 167 which extend through the guides 164 into the hulls 162. The hull 162 is further supported in its extended position by means of triangular braces 168 pivotally connected to the main area 163 and moveable between an inoperative position alongside the side walls of the main area 163 and an operative position as shown in FIG. 24 where pins 169 are passed through the braces 168 into the hull 162 to brace the latter in use.

For moving the hull 162 to an inoperative position, a winch 170 is provided on the main area 163 and a cable 171 passes about a pulley 172 adjacent the upper end of the guide 164 and connects to the hull 162 adjacent the pins 165. It will be apparent from FIGS. 25 and 26 that winding up of the winch 170 and thus cable 171 will elevate the end of the hull 162 adjacent the main area 163 until it lies in a generally vertical attitude adjacent the main area 163. The hull 162 may be restrained against sideways movement by means of the braces 168 which may be pivoted to the position of FIG. 26 and secured to the hull 162 if desired. As well the previous embodiments, the mating bulkheads of the hulls 162 and 166 may be providing with mating cut-out portions defining passageways between the hulls.

It will be apparent that various features of the embodiments of accommodation units described above may be combined into one craft and where desired a pair of foldable hulls may be provided at opposite ends of the main accommodation area. Furthermore in lieu of the hand winch and cable arrangements described, various electric winches may be employed. Alternatively hydraulic or pneumatic powered rams may be used for folding or extending the hulls of the respective units described. A suitable location for such a ram is shown in dotted outline at 173 of FIG. 3.

To further prevent water passing between the adjacent bulkheads of respective hulls, rubber seals or seals of other material may be located between the bulkheads or alternatively flaps of flexible material may close over the join between the bulkheads.

The units described above may be powered by outboard motor or alternatively inboard motors may be employed. The units according to the invention may be constructed of aluminium, timber or glass fibre such as fibreglass sandwich construction.

In each case the extended hull portions of the units considerably increase the living space of the unit when used in a water mode. Furthermore, if desired, open hull portions may be detached and used independently and if required motive power to such hulls may be provided by an outboard motor mounted over the cut out portion of the rear bulkhead.

In the FIG. 21 embodiment, the brace 137 may be employed as a lever to assist in moving the hull from the FIG. 22 position to the FIG. 21 position for example by means of winched cables.

In the embodiment of FIG. 5, means other than the pin 40 may be provided for supporting the pivot pin 25 in its upper position. Such means may take the form of a triangle braces similar to that shown in FIGS. 24 to 26 which will perform the dual function of supporting the pivot pins in the required position for folding and serving also to brace the folded hull after it has been moved to its extended position.

Whilst the above has been given by way of illustrative embodiment of the present invention, all such variations and modifications as would be apparent to persons skilled in the art are deemed to fall within the broad scope and ambit of the invention as defined by the claims. For example a main accommodation area of the type 12 shown in FIG. 1 may be provided with different combinations of foldable hulls at each end of any of the above described forms.

I claim:

1. An amphibious accommodation unit comprising a first portion defining an accommodation area within said unit, said first portion including a first hull, a second portion defining a second hull, and means interconnecting said first and second portions, said interconnecting means including means permitting said second portion to move between a first attitude wherein said second hull is longitudinally aligned with, to comprise an extension of said first hull so that said accommodation unit may be used on water and a second attitude wherein said second portion is disposed substantially upright and adjacent said first portion, and means for moving said second portion between said first and said second attitudes, said moving means being operative to elevate said second portion from said second attitude and being further operative to permit said second portion to pivot about an axis extending transversely of said hulls to said first attitude.

2. A unit according to claim 1 wherein said moving means is further operative to pivot said second portion from said first attitude to a generally upright attitude and to lower said second portion to said second attitude.

3. A unit according to claim 2 wherein said interconnecting means comprising guide means on one of said first or second portions and means adapted for pivotal engagement with said guide means on the other of said first and second portions, said pivotal engagement means being movable relatively along said guide means during said elevation or lowering of said second portion and towards and away form a position therealong whereat said second portion is permitted to move about said transversely extending axis towards and away from said first attitude.

4. A unit according to claim 3 wherein said guide means are secured to said first portion on opposite sides thereof and wherein said pivotal engagement means comprise pivot pins on said second portion.

5. A unit according to claim 4 wherein each said guide means comprises a hollow elongate member secured in an upright attitude to said first portion, each said hollow member being longitudinally slotted and wherein each said pivot pin has an enlarged head captive in said hollow member for movement therealong and wherein the shank of said pivot pin projects through said longitudinal slot for engagement with said second portion.

6. A unit according to claim 5 wherein said pivot pins are located at the lower end of said guide means when said second portion is in said second attitude.

7. A unit according to claim 3 and including means for releasably maintaining said pivotal engagement means at said position along said guide means.

8. A unit according to claim 7 wherein said moving means includes winch means mounted to said first portion and cable means extending from said winch means to said second portion, said winch means being operable to wind up said cable means and elevate said second portion from said second attitute until said pivotal engagement means is moved to said position along said guide means and wherein said winch means is further operable to unwind said cable means whereby to permit said second portion to pivot about said transverse axis to said first attitude after said pivotal engagement means is maintained at said position along said guide means by said releasable maintaining means.

9. A unit according to claim 8 wherein said winch means is further operable when said second portion is in said first attitude to wind up said cable means and cause said second portion to pivot about said transverse axis to a substantially upright attitude and subsequently unwind said cable means to lower said second portion to said second attitude when said pivotal engagement means is released from said position along said guide means.

10. A unit according to claim 8 wherein said cable means is connected to opposite sides of said second position and is guided transversely of said first portion.

11. A unit according to claim 1 wherein said first and second hulls include bulkheads, said bulkheads being juxtaposed when said second portion is in said first attitude and wherein said bulkheads include cut-out portions which mate when said second portion is disposed in said first attitude and which are disposed above the floating water level of said unit to define a passageway between said first and second portions.

12. A unit according to claim 1 and including locking means for selectively locking said second hull in said first attitude.

13. A unit according to claim 1 wherein said first and second portions are provided with cooperative coupling means adapted to be releasably engaged to maintain said second portion in said second attitude.

14. A unit according to claim 13 wherein said cooperative coupling means are moved out of register with each other when said second portion is moved away from said second attitude.

15. A unit according to claim 1 wherein said first and second hulls are provided with transversely extending complimentary recess and rib means adapted to cooperate when said second hull is in said first attitude.

16. A unit according to claim 1 and including awning means adapted to be moved to a position overlying said second portion when the latter is in said first attitude.

17. A unit according to claim 16 wherein said first portion includes a roof, guide means on said roof and extending longitudinally of said unit, said awning means being guided for movement along said guide means between a first position overlying said roof and said position overlying said second portion.

18. A unit according to claim 1 and including bracing means for bracing said second portion against movement relative to said first portion when said second portion is in said first attitude.

19. A unit according to claim 18 wherein said bracing means comprise railing means on opposite sides of said second portion, said railing means being pivotally movable to a first upright operative bracing position between said first portion and said second portion, and a second folded in operative position.

20. A unit according to claim 1 wherein said accommodation area is defined by front and rear walls, a pair of opposite side walls and a roof and wherein said second portion in said second attitude extends substantially between said first hull and said roof of said accommodation area.

21. An amphibious accommodation unit comprising a first portion defining an accommodation area within said unit, said first portion including a first hull, a second portion defining a second hull, guide means on opposite sides of said first portion, a pair of pivot members on opposite sides of said second portion and engaged with the respective said guide means for slidable movement therealong, sand means for moving said second portion between a first attitude wherein said second hull is longitudinally aligned with, to comprise an extension of, said first hull and a second attitude wherein said second portion is disposed substantially upright and adjacent said first portion, said moving means being operable to move said second portion away from said second attitude and said pivot members along said guide means and being further operable to permit said second portion to pivot about a transversely extending axis defined by said pivot members to said first attitude.

22. A unit according to claim 21 wherein said moving means is further operable to pivot said second portion about said transverse axis from said first attitude to a generally upright attitude and to move said pivot members along said guide members and said second portion to said second attitude.

23. A unit according to claim 22 and including means for releasably maintaining said pivot members along said guide means at said transverses axis during pivotal movement of said second portion towards and away form said first attitude.

24. An amphibious accommodation unit comprising a first portion defining an accommodation area within said unit, said first portion including a first hull, a second portion defining a second hull, guide means on one of said first or second portions, and means adapted for pivotal engagement with said guide means on the other of said first and second portions, and means for moving said second portion between a first attitude wherein said second hull is longitudinally aligned with, to comprise an extension of, said first hull and a second attitude wherein said second portion is disposed substantially upright and adjacent said first portion, said moving means being operable to move said second portion away from said second attitude and said pivotal engagement means relatively along said guide means to a pivot position, and being further operable to permit said second portion to pivot about a transversely extending axis at said pivot position to said first attitude.

25. A unit according to claim 24 wherein said moving means is further operable to pivot said second portion away from said first attitude about said transversely extending axis and move said pivotal engagement means relative along said guide means and said second portion to said second attitude.

26. An amphibious accommodation unit comprising a first portion defining an accomodation area within said unit, said first portion including a first hull and said acccommodation area including front and rear walls, opposite side walls and a roof, a second portion defining a second hull, means interconnecting said first and second portions and means for moving said second portion between as first attitude wherein said second hull is longitudinally aligned with, to comprise an extension of said first hull so that said accommodation unit may be used on water and a second attitude wherein said second hull is disposed substantially upright and adjacent said front wall of said accommodation area, said second portion in said second attitude extending substantially between the hull and roof of said first portion.

27. A unit according to claim 26 wherein said interconnecting means includes guide means on one of said first and second portions and means adapted for pivotal engagement with said guide means on the other of said first and second portions, said moving means being operable to move said pivotal engagement means along said guide means and permit pivotal movement of said second portion about a transverse axis defined by said pivotal engagement means upon movement of said second portion between said first and second attitudes.

* * * * *

UNITED STATES PATENT AND TRADEMARK OFFICE
CERTIFICATE OF CORRECTION

PATENT NO. : 4,869,194
DATED : September 26, 1989
INVENTOR(S) : IAN G. CUMMINS

It is certified that error appears in the above-identified patent and that said Letters Patent is hereby corrected as shown below: On the title page:

[30] FOREIGN APPLICATION PRIORITY DATA

| | | |
|---|---|---|
| June 4, 1987 | AUSTRALIA | PI2300 |
| June 24, 1987 | AUSTRALIA | PI2673 |
| July 29, 1987 | AUSTRALIA | PI3393 |
| August 5, 1987 | AUSTRALIA | PI3555 |
| Sept. 9, 1987 | AUSTRALIA | PI4251 |
| Sept. 24, 1987 | AUSTRALIA | PI4545 |
| January 8, 1988 | AUSTRALIA | PI6216 |

Column 12, line 9 "position" should be --portion--
 line 65 "sand" should be --and--

Column 13, line 16 "transverses" should be --transverse--

Column 14, line 7 "relative" should be --relatively--

Signed and Sealed this

Fourteenth Day of August, 1990

Attest:

HARRY F. MANBECK, JR.

*Attesting Officer*     *Commissioner of Patents and Trademarks*